United States Patent
Yang et al.

(10) Patent No.: US 10,800,420 B1
(45) Date of Patent: Oct. 13, 2020

(54) METHOD OF CONTROLLING LAUNCH OF VEHICLE

(71) Applicants: Hyundai Motor Company, Seoul (KR); Kia Motors Corporation, Seoul (KR)

(72) Inventors: Sang Suk Yang, Suwon-si (KR); Hyun Jin Yu, Incheon (KR); Jin Young Kim, Suwon-si (KR); Min Chan Jung, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/564,945

(22) Filed: Sep. 9, 2019

(30) Foreign Application Priority Data

May 7, 2019 (KR) ........................ 10-2019-0052790

(51) Int. Cl.
*B60W 30/188* (2012.01)
*B60W 10/04* (2006.01)
*B60W 10/10* (2012.01)

(52) U.S. Cl.
CPC .......... *B60W 30/188* (2013.01); *B60W 10/04* (2013.01); *B60W 10/10* (2013.01); *B60W 2510/18* (2013.01); *B60W 2510/207* (2013.01); *B60W 2520/266* (2013.01); *B60W 2520/30* (2013.01); *B60W 2540/10* (2013.01); *B60W 2720/406* (2013.01)

(58) Field of Classification Search
None
See application file for complete search history.

(56) References Cited

U.S. PATENT DOCUMENTS

2004/0215385 A1* 10/2004 Aizawa ................. B60K 31/00
701/93
2019/0039425 A1* 2/2019 Dodd .................... B60D 1/015

FOREIGN PATENT DOCUMENTS

KR        10-1844681 B1    5/2018

* cited by examiner

*Primary Examiner* — Justin Holmes
(74) *Attorney, Agent, or Firm* — Morgan, Lewis & Bockius LLP

(57) ABSTRACT

A method of controlling launch of a vehicle may include checking a start condition of the vehicle by a controller, determining whether only predetermined launch creep control torque is set as additional torque or whether the launch creep control torque and predetermined launch pre control torque are set together as the additional torque according to whether an accelerator pedal is manipulated when the start condition is satisfied, by the controller, setting the additional torque by adding launch slip control torque determined in consideration of a wheel speed difference between opposite driving wheels to the additional torque upon determining that the wheel speed difference is greater than a predetermined reference wheel speed, by the controller, and controlling an electric limited slip differential (eLSD) using the set additional torque, by the controller.

13 Claims, 3 Drawing Sheets

METHOD OF CONTROLLING LAUNCH OF VEHICLE

CROSS REFERENCE TO RELATED APPLICATION

The present application claims priority to Korean Patent Application No. 10-2019-0052790, filed on May 7, 2019, the entire contents of which is incorporated herein for all purposes by this reference.

BACKGROUND OF THE INVENTION

Field of the Invention

The present invention relates to a method of controlling launch of a vehicle, and more particularly, to a technology of controlling an electric limited slip differential (eLSD) when a vehicle including the eLSD as an electronic type limited slip differential is launched.

Description of Related Art

An electronic type limited slip differential is configured for actively and precisely controlling a relative slip quantity of opposite driving wheels according to an applied electrical signal.

In the case of rotary driving of a vehicle, an appropriate differential function is required to enable smooth turn of a vehicle, but an unlimited differential function has a side effect by which a vehicle has a difficulty in escaping from a steep path, and thus the limited slip differential is used to limit a differential function at an appropriate level.

The electronic type limited slip differential is referred to as an electric limited slip differential (eLSD), basically may include a clutch mounted between opposite driving wheels connected to a differential device, and is configured to adjust a relative slip quantity of opposite driving wheels by actively adjusting frictional force of the clutch via an actuator.

When the aforementioned eLSD is controlled, torque transferred between opposite driving wheels is controlled by frictional force of a clutch that performs a limited slip differential function as described above.

For reference, hereinafter, control of torque of the eLSD refers to control of torque transferred between opposite driving wheels connected to each other by a clutch by controlling frictional force of the clutch configuring the eLSD, and application of torque to the eLSD also refers to increase in frictional force of the clutch of the eLSD to transfer the corresponding torque between the opposite driving wheels.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method of controlling launch of a vehicle, for applying a situation of a road surface, a vehicle manipulation situation of a driver, and the like to actively control the eLSD to enable smooth and safe launch of the vehicle and to maximize capability of escaping from a steep path when a vehicle including an eLSD is launched, enhancing the marketability of a vehicle.

According to an exemplary embodiment of the present invention, a method of controlling launch of a vehicle may include: checking a start condition of the vehicle by a controller, determining whether only predetermined launch creep control torque is set as an additional torque or whether the launch creep control torque and predetermined launch pre control torque are set together as the additional torque according to whether an accelerator pedal is manipulated when the start condition is satisfied, by the controller, setting the additional torque by adding launch slip control torque determined in consideration of a wheel speed difference between opposite driving wheels to the additional torque upon determining that the wheel speed difference is greater than a predetermined reference wheel speed, by the controller, and controlling an electric limited slip differential (eLSD) using the set additional torque, by the controller.

The method may further include determining an over driving situation in which both the opposite driving wheels slip over a road surface when a driver depresses the accelerator pedal when the start condition is satisfied, by the controller, determining anti-spin torque for preventing any one of the two driving wheels from slipping upon determining the over driving situation, by the controller, and determining final control torque by subtracting the anti-spin torque from the additional torque, by the controller, wherein the eLSD is controlled by the final control torque.

The launch creep control torque may be determined as a predetermined value in consideration of a vehicle weight and driving torque input to the eLSD during creep driving of the vehicle.

The launch pre control torque may be set in consideration of a current gear ratio of a transmission and driving torque input to the eLSD.

The launch slip control torque may be determined by integrating a value obtained by subtracting a predetermined wheel slip offset from the wheel speed difference of the opposite driving wheels and multiplying a resulting value by an integral gain.

The controller may check a driving mode of the vehicle and may differently set the wheel slip offset and the integral gain depending on the driving mode.

Each of the launch creep control torque, the launch pre control torque, and the launch slip control torque may be set to be gradually reduced in the case of a predetermined vehicle speed or greater and may be set to be gradually reduced in the case of a predetermined steering angle or greater.

The controller may check a driving mode of the vehicle, and may differently set an inclination with which each of the launch creep control torque, the launch pre control torque, and the launch slip control torque is changed depending on a vehicle speed and a steering angle according to the driving mode.

The anti-spin torque may be determined by subtracting a predetermined wheel spin offset from a difference between a front wheel average speed and a rear wheel average speed and multiplying a resulting value by wheel spin gain.

The controller may check a driving mode of the vehicle and may differently set the wheel spin offset and the wheel spin gain according to the driving mode.

The start condition may be a state in which driving torque of the vehicle is input to the eLSD and may be satisfied in a state in which a brake is turned off.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
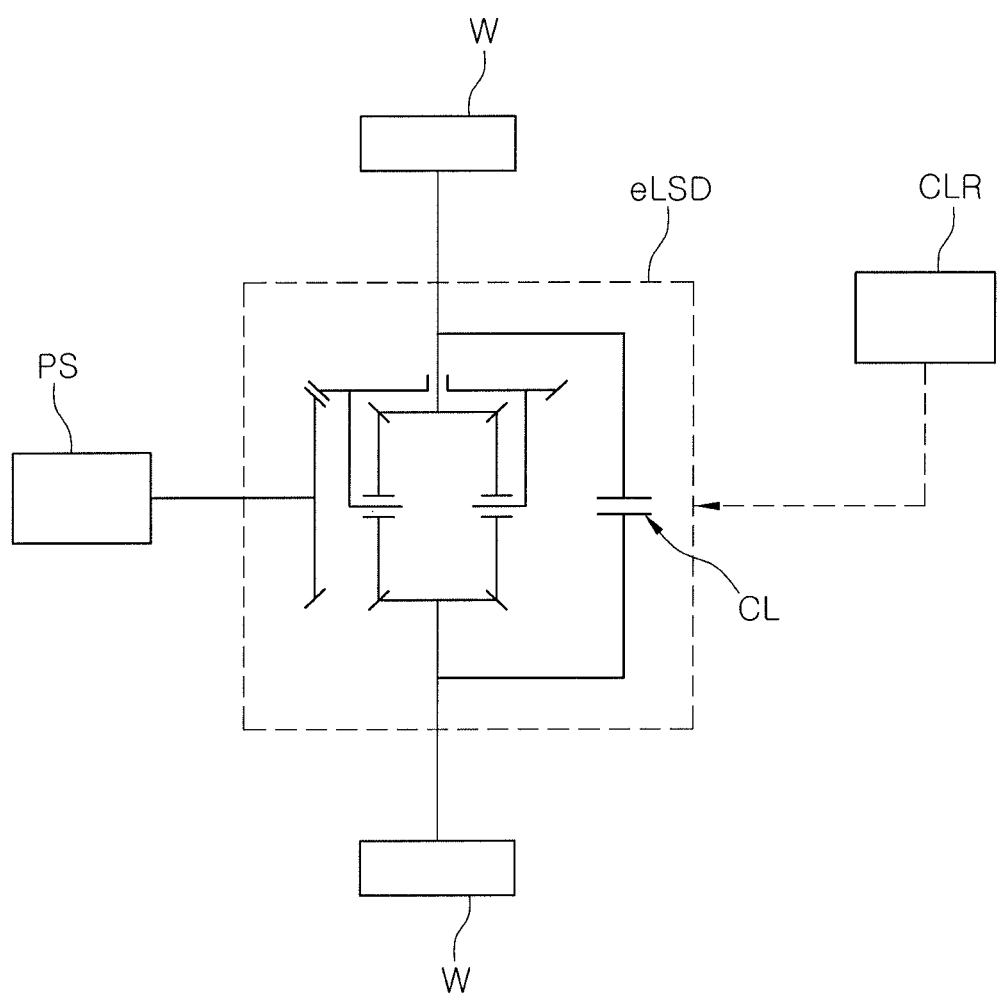
FIG. 1 is a diagram showing a configuration of a vehicle including an electric limited slip differential (eLSD) mounted therein according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Referring to FIG. 1, a vehicle to which an exemplary embodiment of the present invention is applicable may be configured such that an electric limited slip differential (eLSD) distributes driving torque required to drive the vehicle to opposite driving wheels W when the driving torque is provided to the eLSD from a power source PS including an engine and a transmission or a motor and a decelerator, and a controller CLR changes frictional force of a clutch CL configuring the eLSD to vary a ratio of the driving torque transferred to opposite driving wheels W depending on a driving situation of the vehicle, a vehicle manipulation state of a driver, and the like.

Figure 2:
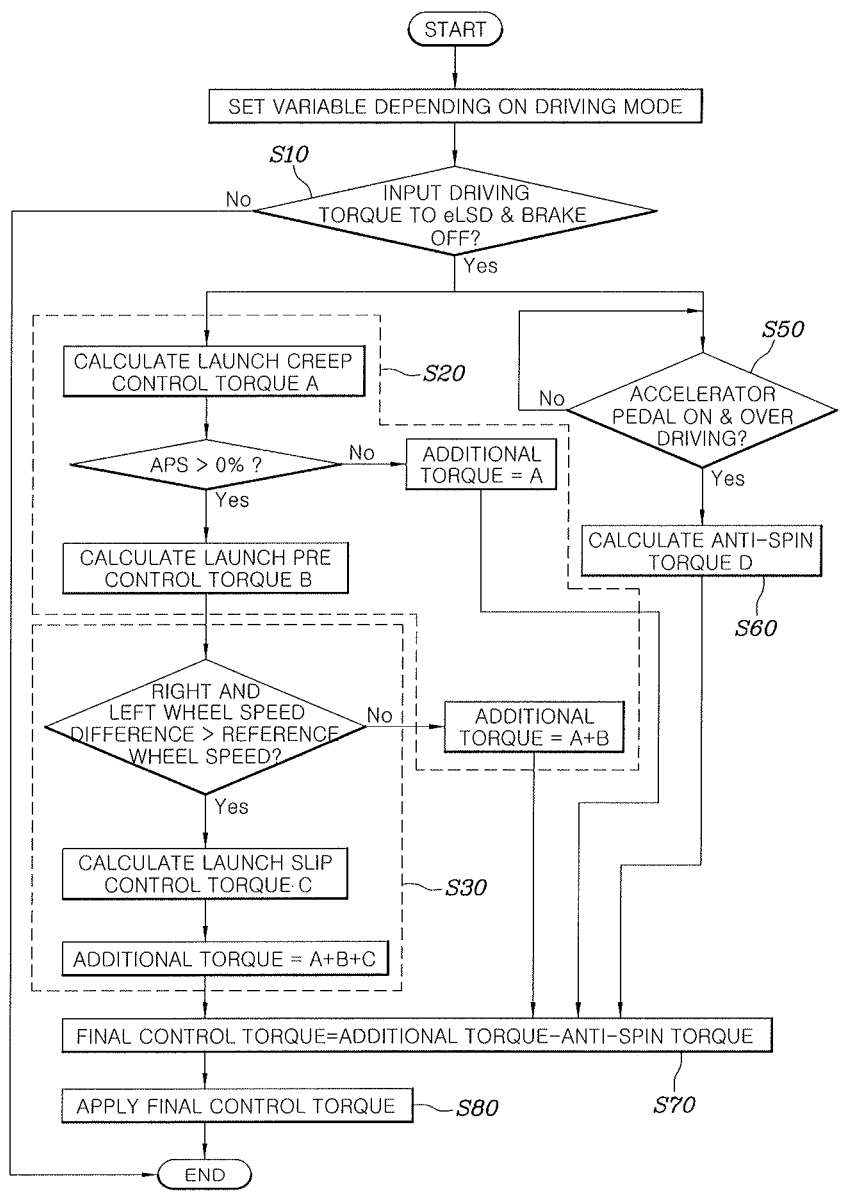
FIG. 2 is a flowchart showing a method of controlling launch of a vehicle according to an exemplary embodiment of the present invention.

Referring to FIG. 2, a method of controlling launch of a vehicle according to an exemplary embodiment of the present invention may include checking a start condition of the vehicle by the controller CLR (S10), determining whether only predetermined launch creep control torque A is set as additional torque or whether the launch creep control torque A and predetermined launch pre control torque B are set together as the additional torque according to whether an accelerator pedal is manipulated when the start condition is satisfied, by the controller CLR (S20), setting the additional torque by adding launch slip control torque C determined in consideration of a wheel speed difference between opposite driving wheels to the additional torque upon determining that the wheel speed difference is greater than a predetermined reference wheel speed, by the controller CLR (S30), and controlling an eLSD using the set additional torque, by the controller CLR (S80).

According to an exemplary embodiment of the present invention, the method may further include determining an over driving situation in which both the opposite driving wheels slip over a road surface when a driver depresses the accelerator pedal when the start condition is satisfied, by the controller CLR (S50), determining anti-spin torque D for preventing any one of the two driving wheels from slipping upon determining the over driving situation, by the controller CLR (S60), and determining final control torque by subtracting the anti-spin torque D from the additional torque, by the controller CLR, and the eLSD is controlled by the final control torque.

That is, according to an exemplary embodiment of the present invention, when the start condition is satisfied and launch of the vehicle is determined to begin, primarily, the sum of the launch creep control torque A and the launch pre control torque B may be set as the additional torque or only the launch creep control torque A is set as the additional torque according to whether the vehicle is launched while a driver depresses an accelerator pedal, secondarily, when a wheel speed difference between opposite right and left driving wheels is greater than the reference wheel speed, the launch slip control torque C may be further added to the additional torque to determine the additional torque, and when both the opposite driving wheels slip over a road surface while the accelerator pedal is depressed, the anti-spin torque D may be determined, final control torque may be determined by subtracting the anti-spin torque D from the additional torque, and a torque of the eLSD may be controlled by the final control torque.

The start condition may be a state in which driving torque of the vehicle is input to the eLSD and may be satisfied when a brake is turned off That is, when a driver actively depresses an accelerator pedal or the brake is turned off and a vehicle performs creep driving without depression of the accelerator pedal, the start condition may also be satisfied.

The launch creep control torque A may prevent any one of driving wheels from excessively spinning when the vehicle is started from a state in which the vehicle stops on a slippery road by starting the vehicle in a state in which torque of the eLSD is pre-applied at a predetermined level because the controller CLR is not configured for knowing a friction coefficient of the road surface when the vehicle intends to start in a stop state.

That is, the launch creep control torque A may prevent loss in driving force due to excessive spin of any one of driving wheels and may prevent the durability of a clutch of an eLSD from being degraded, which may be caused due to irregular frictional characteristics of a road surface on which the vehicle stops when the vehicle is started as described above.

The launch creep control torque A may be determined as a predetermined value in consideration of a vehicle weight and driving torque input to the eLSD during creep driving of the vehicle, may be set as a greater value as the vehicle weight is increased, and may be set as a greater value as amplitude of driving torque supplied to the eLSD is increased in the case of general creep driving of the corresponding vehicle, and thus the launch creep control torque A may be determined in terms of design via a plurality of experiments and analysis according to the aforementioned purpose of the launch creep control torque A.

Here, the driving torque input to the eLSD refers to torque input to the eLSD through a transmission from an engine in a conventional vehicle including the engine and refers to torque input to the eLSD through a decelerator or the like from a motor in a vehicle for generating driving force of the vehicle by a motor, such as an electric vehicle.

When a vehicle is started, if a driver wants rapid start or depresses an accelerator pedal to a high degree to prevent backward slip over an uphill road, wheel spin also occurs while driving wheels slip on a relatively slippery road surface to degrade launch performance, and thus the launch pre control torque B may be used to prepare for the present situation.

Accordingly, the launch pre control torque B may be set in consideration of a current gear ratio of a transmission and driving torque input to the eLSD, may be set as a greater value as the current gear ratio is increased or the driving torque input to the eLSD is increased, and may be determined in terms of design via a plurality of experiments and analysis according to the purpose for setting the launch pre control torque B.

The launch pre control torque B may also be set in proportion to a degree of manipulation of an accelerator pedal of a driver. Accordingly, the launch pre control torque B may also be set in proportion to an accelerator position sensor (APS) signal value in the situation of APS signal value is greater than 0.

The launch creep control torque A may be torque which is basically applied to the eLSD because a state of a road surface is not known when a vehicle is launched in a state in which a driver does not depress an accelerator pedal, and the launch pre control torque B may be torque applied to the eLSD depending on driving torque input to the eLSD depending on a degree of manipulation of the accelerator pedal of the driver in the case of launch and may be considered as a Feedforward control value.

The launch slip control torque C may be considered as a Feedback control value determined by integrating a value obtained by subtracting a predetermined wheel slip offset from the wheel speed difference of the opposite driving wheels and multiplying a resulting value by an integral gain.

That is, both the launch creep control torque A and the launch pre control torque B are a Feedforward control component and have a limit in that it is difficult to accurately apply situations of a vehicle and a road surface, which are changed in real time, and thus when a wheel speed difference between the opposite driving wheels is equal to or greater than a predetermined level to overcome the present limit, the launch slip control torque C may be additionally applied to the eLSD depending on a wheel slip quantity which is the wheel speed difference of the opposite driving wheels, thus preventing an increase in the wheel slip quantity.

Accordingly, the reference wheel speed may be a value close to a maximum value of the wheel slip quantity which is to be permitted in a normal driving situation of a vehicle and may be set in terms of design via a plurality of experiments and analysis according to vehicles.

The wheel slip offset may be used to limit differential in a level for ensuring a wheel slip quantity for facilitating normal turn of a vehicle rather than controlling the wheel slip quantity of the opposite driving wheels to be 0, thus ensuring smooth turn characteristics, and may be set according to a speed difference between a turn internal wheel and a turn external wheel during normal turn of the vehicle.

The launch slip control torque C may be determined by integrating a value obtained by subtracting the wheel slip offset from the wheel speed difference of the opposite driving wheels and multiplying a result value by an integral gain as described above rather than using the value obtained by subtracting the wheel slip offset from the wheel speed difference of the opposite driving wheels without change, and thus substantial integral control may be performed to prevent torque applied to the eLSD from being remarkably changed, preventing hopping and a torque steer corresponding to a degree which is not configured for being controlled by a driver.

The controller CLR may check a driving mode of the vehicle and may differently set the wheel slip offset and the integral gain depending on the driving mode.

That is, the wheel slip offset and the integral gain may be differently set according to whether a driving mode of a vehicle, which is selected by the driver, is normal, sport, or eco, achieving vehicle driving characteristic which is more appropriate for each driving mode.

Each of the launch creep control torque A, the launch pre control torque B, and the launch slip control torque C may be set to be gradually reduced in the case of a predetermined vehicle speed or greater and may be set to be gradually reduced in the case of a predetermined steering angle or greater.

That is, the launch creep control torque A, the launch pre control torque B, and the launch slip control torque C may be set to control in the case of launch from a state in which the vehicle stops, when a vehicle speed is increased to a predetermined vehicle speed or greater, the launch creep control torque A, the launch pre control torque B, and the launch slip control torque C may be gradually reduced to prevent an operation of the eLSD, which is unnecessary for driving of the vehicle, and when a steering angle of the vehicle is much increased like in a parking situation, an unnecessary operation of the eLSD may also be prevented to enable smooth parking.

Accordingly, the predetermined vehicle speed and the predetermined steering angle may be determined in terms of design via a plurality of experiments and analysis according to the purpose described above.

Figure 3:
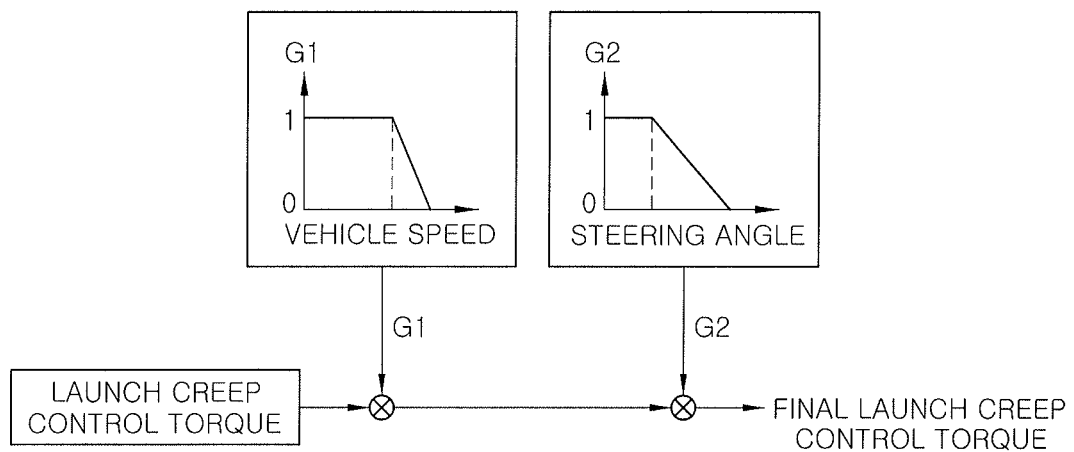
FIG. 3 is a block diagram for explanation of limitation of launch creep control torque depending on a vehicle speed and a steering angle according to an exemplary embodiment of the present invention.

For reference, FIG. 3 is a block diagram for explanation of a change in amplitude of the launch creep control torque A depending on a vehicle speed and a steering angle, and the final launch creep control torque A may be determined by multiplying gain G1 set depending on a vehicle speed and gain G2 set depending on a steering angle.

Needless to say, the launch pre control torque B and the launch slip control torque C may also be configured to limit amplitude thereof depending on a vehicle speed and a steering angle using a similar method as the aforementioned method.

The controller CLR may check a driving mode of a vehicle and may differently set an inclination with which each of the launch creep control torque A, the launch pre control torque B, and the launch slip control torque C is changed depending on a vehicle speed and a steering angle according to a driving mode.

That is, the inclination may be differently set according to whether a driving mode of the vehicle is normal or sport, achieving vehicle driving characteristic which is more appropriate for each driving mode.

The anti-spin torque D may be used to exert appropriate driving force by at least one driving wheel over a road surface with a relatively high friction coefficient among two driving wheels to enable the vehicle to escape from the road surface in an over driving situation in which both the opposite driving wheels slip over a road surface when a driver excessively depresses the accelerator pedal.

For reference, in the case of a front-wheel driving vehicle, when a difference between front and rear left wheel speeds of the vehicle and a difference between front and rear right wheel speeds are each equal to or greater than a predetermined level, this may be determined as a situation in which all the opposite driving wheels spin over a road surface, and thus the controller CLR may determine the present condition and may determine the situation as the over driving situation.

The anti-spin torque D may be determined by subtracting a predetermined wheel spin offset from a difference between front wheel average speed and a rear wheel average speed and multiplying a resulting value by wheel spin gain.

Here, the wheel spin offset may be used to unequalize an average speed of a front wheel which is a driving wheel and an average speed of a rear wheel which is a driven wheel and to allow a predetermined speed difference, may be an upper limit of a speed difference which is generated in the case of soft and smooth driving of the vehicle, and may be set in terms of design via a plurality of experiments and analysis.

The wheel spin gain may be determined in terms of design via a plurality of experiments and analysis to enable at least one of the opposite driving wheels to exert maximum driving force without spinning when the final control torque determined by subtracting the wheel anti-spin torque D from the additional torque as described above.

The controller CLR may check a driving mode of the vehicle and may differently set the wheel spin offset and the wheel spin gain depending on the driving mode, achieving vehicle driving characteristic which is more appropriate for each driving mode.

For reference, setting of a variable depending on a driving mode in FIG. 2 may refer to setting of a variable such as wheel slip offset, integral gain, wheel spin offset, wheel spin gain, and an inclination with which each of the launch creep control torque A, the launch pre control torque B, and the launch slip control torque C is changed depending on a vehicle speed and a steering angle according to a driving mode selected by a driver.

As described above, the controller CLR may determine the final control torque by subtracting the anti-spin torque D from the additional torque determined by a combination of the launch creep control torque A, the launch pre control torque B, and the launch slip control torque C, and may control the eLSD based on the final control torque to enable smooth and safe launch of the vehicle and to maximize capability of escaping from a steep path, enhancing the marketability of a vehicle.

According to an exemplary embodiment of the present invention, when a vehicle including an eLSD is launched, a situation of a road surface, a vehicle manipulation situation of a driver, and the like may be applied to actively control the eLSD to enable smooth and safe launch of the vehicle and to maximize capability of escaping from a steep path, enhancing the marketability of a vehicle.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling launch of a vehicle, the method comprising:
   checking, by a controller, a start condition of the vehicle;
   determining, by the controller, when predetermined launch creep control torque is set as additional torque or when the predetermined launch creep control torque and predetermined launch pre control torque are set together as the additional torque according to when an accelerator pedal is manipulated upon determining that the start condition is satisfied;
   setting, by the controller, the additional torque by adding launch slip control torque determined in consideration of a wheel speed difference between left and right driving wheels to the additional torque upon determining that the wheel speed difference is greater than a predetermined reference wheel speed; and
   controlling, by the controller, an electric limited slip differential (eLSD) using the set additional torque.

2. The method of claim 1, further including:
   determining, by the controller, an over driving situation in which the left and right driving wheels slip over a road surface, upon determining that the start condition is satisfied and the accelerator pedal is depressed;
   determining, by the controller, anti-spin torque for preventing at least one of the left and right driving wheels from slipping upon determining that the vehicle is in the over driving situation; and
   determining, by the controller, final control torque by subtracting the anti-spin torque from the set additional torque,
   wherein the eLSD is configured to be controlled by the final control torque.

3. The method of claim 1,
   wherein the predetermined launch creep control torque is determined as a predetermined value in consideration of a vehicle weight and driving torque input to the eLSD during creep driving of the vehicle.

4. The method of claim 3,
   wherein the predetermined launch pre control torque is set in consideration of a current gear ratio of a transmission and the driving torque input to the eLSD.

5. The method of claim 4,
   wherein the predetermined launch pre control torque is set as a greater value as a current gear ratio is increased or the driving torque input to the eLSD is increased.

6. The method of claim 4,
wherein the predetermined launch pre control torque is set in proportion to an accelerator position sensor (APS) signal value in a situation of APS signal value is greater than 0.

7. The method of claim 1,
wherein the launch slip control torque is determined by integrating a value obtained by subtracting a predetermined wheel slip offset from the wheel speed difference of the left and right driving wheels to form a resulting value and multiplying the resulting value by an integral gain.

8. The method of claim 7,
wherein the controller is configured to check a driving mode of the vehicle and differently sets the predetermined wheel slip offset and the integral gain depending on the driving mode.

9. The method of claim 1,
wherein each of the predetermined launch creep control torque, the predetermined launch pre control torque, and the launch slip control torque is set to be reduced upon determining that the vehicle speed is equal to or greater than a predetermined vehicle speed and is set to be reduced upon determining that a steering angle is equal to or greater than a predetermined steering angle.

10. The method of claim 9,
wherein the controller is configured to check a driving mode of the vehicle, and to set differently an inclination with which each of the predetermined launch creep control torque, the predetermined launch pre control torque, and the launch slip control torque is changed depending on the vehicle speed and the steering angle according to the driving mode.

11. The method of claim 2,
wherein the anti-spin torque is determined by subtracting a predetermined wheel spin offset from a difference between a front wheel average speed and a rear wheel average speed to form a resulting value and multiplying the resulting value by a wheel spin gain.

12. The method of claim 11,
wherein the controller is configured to check a driving mode of the vehicle and to set differently the predetermined wheel spin offset and the wheel spin gain according to the driving mode.

13. The method of claim 1,
wherein the start condition is a state in which driving torque of the vehicle is input to the eLSD and is satisfied while a brake is turned off.

* * * * *